United States Patent
Hoff et al.

(10) Patent No.: US 9,556,807 B2
(45) Date of Patent: Jan. 31, 2017

(54) TRANSMISSION SYSTEM HAVING TEMPERATURE BASED INPUT CONTROL

(71) Applicant: Caterpillar Inc., Peoria, IL (US)

(72) Inventors: Brian D. Hoff, East Peoria, IL (US);
Mark E. Rettig, East Peoria, IL (US);
Michael D. Beyer, Oswego, IL (US);
Steven D. Spencer, Germantown Hills, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/729,716

(22) Filed: Jun. 3, 2015

(65) Prior Publication Data

US 2015/0354474 A1 Dec. 10, 2015

Related U.S. Application Data

(60) Provisional application No. 62/009,619, filed on Jun. 9, 2014.

(51) Int. Cl.
| | |
|---|---|
| *F16H 59/00* | (2006.01) |
| *F02D 29/02* | (2006.01) |
| *F16H 63/50* | (2006.01) |
| *F02D 41/02* | (2006.01) |
| *F16H 3/00* | (2006.01) |
| *F16H 47/04* | (2006.01) |
| *F16H 37/08* | (2006.01) |

(52) U.S. Cl.
CPC ............. *F02D 29/02* (2013.01); *F02D 41/022* (2013.01); *F16H 63/50* (2013.01); *F02D 41/023* (2013.01); *F02D 41/0215* (2013.01);
*F02D 2200/023* (2013.01); *F02D 2250/26* (2013.01); *F16H 3/006* (2013.01); *F16H 47/04* (2013.01); *F16H 2037/088* (2013.01); *F16H 2063/508* (2013.01); *Y10T 477/675* (2015.01)

(58) Field of Classification Search
None
See application file for complete search history.

(56) References Cited

U.S. PATENT DOCUMENTS

| | | | | |
|---|---|---|---|---|
| 3,851,723 | A * | 12/1974 | Pagdin | B60K 28/00 180/233 |
| 4,703,304 | A * | 10/1987 | Muguruma | F16H 59/62 340/439 |
| 4,815,340 | A | 3/1989 | Iwatsuki et al. | |
| 6,620,076 | B1 | 9/2003 | Kawamura et al. | |
| 6,645,121 | B2 * | 11/2003 | Wu | F16H 59/72 477/98 |
| 6,923,158 | B2 | 8/2005 | Kang et al. | |

(Continued)

*Primary Examiner* — Dirk Wright
(74) *Attorney, Agent, or Firm* — Caterpillar Inc.; James Bennin

(57) ABSTRACT

A transmission system is disclosed for use with an engine. The transmission system may have a plurality of gear sets, an input member configured to be powered by the engine and to drive the plurality of gear sets, an output member driven by the plurality of gear sets, and at least one clutch configured to selectively engage select gears of the plurality of gear sets. The transmission system may also have a controller in communication with the engine. The controller may be configured to generate an estimated temperature of the at least one clutch. The controller may further be configured to selectively derate the engine based on the estimated temperature.

20 Claims, 4 Drawing Sheets

(56) References Cited

U.S. PATENT DOCUMENTS

| | | | |
|---|---|---|---|
| 7,121,976 B2 * | 10/2006 | Sakamoto | B60W 10/06 |
| | | | 477/107 |
| 7,410,446 B2 | 8/2008 | DeMarco | |
| 8,057,357 B2 * | 11/2011 | Kimura | B60L 11/14 |
| | | | 477/107 |
| 8,065,047 B2 * | 11/2011 | Hasegawa | B60K 6/48 |
| | | | 701/22 |
| 8,585,544 B2 | 11/2013 | Honda | |
| 8,647,235 B2 | 2/2014 | Thomas et al. | |
| 2010/0121542 A1 | 5/2010 | Tsukamoto et al. | |
| 2012/0004814 A1 | 1/2012 | Hyodo et al. | |
| 2014/0257657 A1 * | 9/2014 | Plante | B60W 10/023 |
| | | | 701/68 |

* cited by examiner

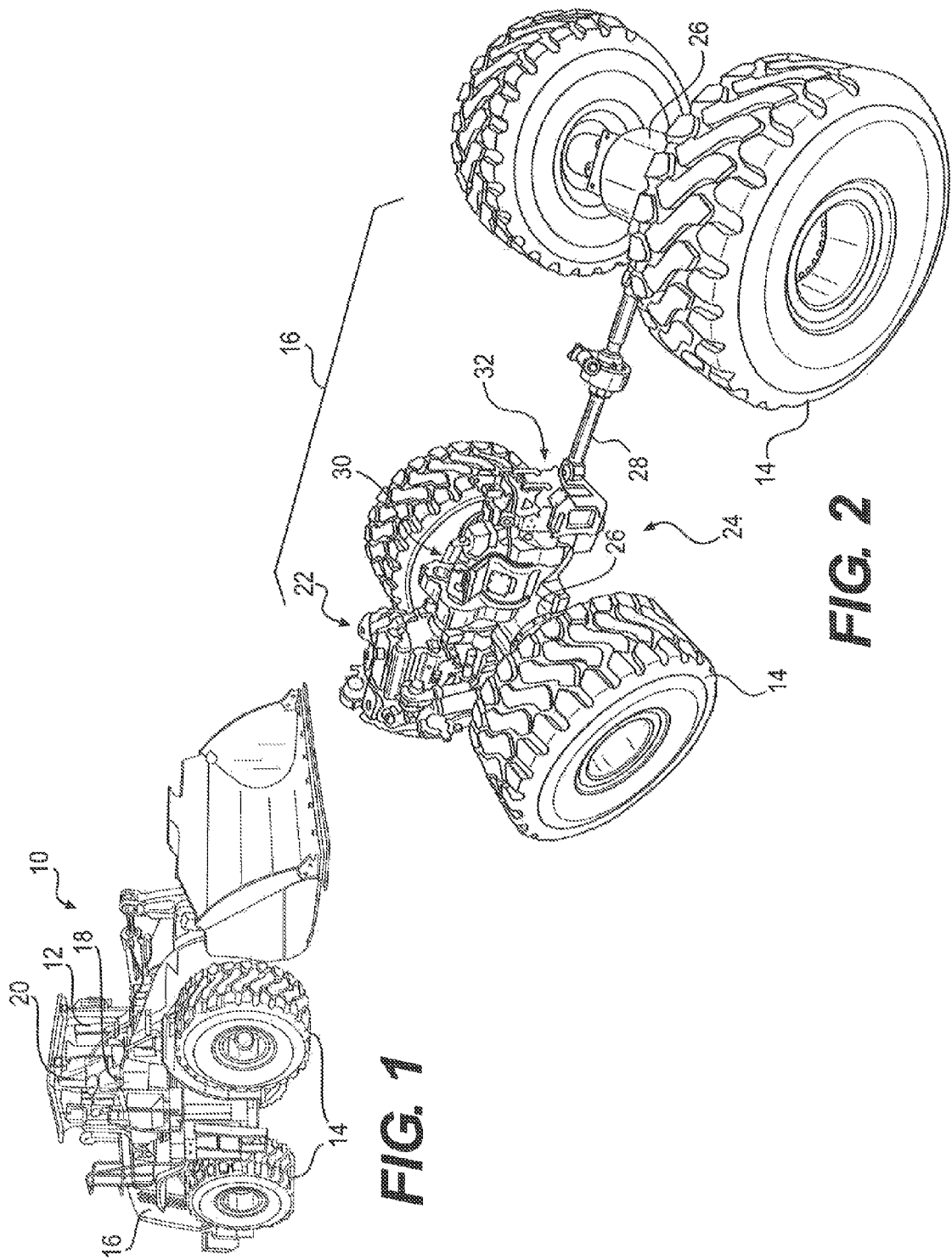

TRANSMISSION SYSTEM HAVING TEMPERATURE BASED INPUT CONTROL

RELATED APPLICATIONS

This application is based on and claims priority to U.S. Provisional Application No. 62/009,619 filed on Jun. 9, 2014, the contents of which are expressly incorporated herein by reference.

TECHNICAL FIELD

The present disclosure relates generally to a transmission system and, more particularly, to a transmission system having temperature based input control.

BACKGROUND

Machines, such as wheel loaders and haul trucks, include an engine that provides power to wheels of the trucks via a planetary-type transmission. A planetary-type transmission is generally made up of at least three different elements, including a sun gear, a planet carrier having at least one set of planet gears, and a ring gear. The planet gears of the planet carrier mesh with the sun gear and the ring gear. One of the sun gear, planet carrier, and ring gear is driven as an input to the transmission, while another of the sun gear, planet carrier, and ring gear rotates as an output of the transmission. The sun gear, planet carrier, planet gears, and ring gear can all rotate simultaneously to transmit power from the input to the output at a first ratio of speed-to-torque and in a forward direction or, alternatively, one of the sun gear, planet carrier, and ring gear can be selectively held stationary or locked to rotate with another gear and thereby transmit power from the input to the output at a second ratio of speed-to-torque and/or in a reverse direction. The change in rotational direction and/or ratio of the transmission depends upon the number of teeth in the sun and ring gears, the gear(s) that is selected as the input, the gear(s) that is selected as the output, and which gear, if any, is held stationary or rotationally locked with another gear. A hydraulic clutch (also commonly referred to as a brake) is used to hold particular gears stationary or to lock the rotation of particular gears together.

A continuously variable transmission (CVT) can include the planetary arrangement described above, and also a variator that operates in parallel with the planetary arrangement. The variator (e.g., a pump/motor pairing) can be used as a second input to the planetary arrangement (e.g., as an input to any one of the sun gear, planet carrier, or ring gear in place of the clutch) to provide a variable output ratio of the arrangement. In some configurations, additional planetary gear sets (with clutches) are included and arranged downstream of and driven by the first planetary gear set and variator, such that distinct gear ranges can be achieved, each having a variable output within the range.

The actuation speed and/or force of a clutch used to hold a gear stationary or to lock the rotation of one gear to another gear can vary based on a viscosity of the oil within the clutch. For example, when operating in cold temperatures (e.g., in cold ambient temperatures and/or at first startup), the clutch may apply a lower force and/or actuate more slowly than when operating in warmer temperatures. Accordingly, for a given input speed and/or force from the associated engine, the transmission may perform differently under different conditions. And when tuned for standard (e.g., warm) operating conditions, shifting during cold conditions (particularly when shifting between forward and reverse) can cause shock loading that damages the machine and/or that is uncomfortable to an operator of the machine.

An exemplary transmission system is disclosed in U.S. Pat. No. 8,647,235 (the '235 patent) of Thomas et al. that issued on Feb. 11, 2014. Specifically, the '235 patent discloses a system configured to regulate an input speed of a power shift transmission based on a temperature of fluid within the transmission. A temperature sensor is provided to sense the temperature of the fluid, and a controller is in communication with the sensor and an associated engine. When the fluid temperature is below 210° F., the controller sets a speed of the engine to no greater than 900 rpm during a gear shift. And when the fluid temperature is above 210° F., the controller sets the speed of the engine to no less than 1000 rpm during a gear shift.

Although the strategy employed by the controller of the '235 patent may have some effect on shift quality, the focus of the strategy is improving fuel efficiency of the engine. For this reason, the controller may not consider factors (other than a sensed temperature) that can affect shift quality. In addition, the strategy may lack broad applicability to continuously variable transmissions, whose clutches are not modulated in the same matter as power-shift transmissions. That is, the clutches of a power shift transmission are gradual-force type clutches that may not be as affected by temperature fluctuations, whereas continuously variable transmissions may employ on/off type clutches that can experience greater performance fluctuations.

The disclosed transmission system is directed to overcoming one or more of the problems set forth above and/or other problems of the prior art.

SUMMARY

In one aspect, the present disclosure is directed to a transmission system for use with an engine. The transmission system may include a plurality of gear sets, an input member configured to be powered by the engine and to drive the plurality of gear sets, an output member driven by the plurality of gear sets, and at least one clutch configured to selectively engage select gears of the plurality of gear sets. The transmission system may also include a controller in communication with the engine. The controller may be configured to generate an estimated temperature of the at least one clutch. The controller may further be configured to selectively derate the engine based on the estimated temperature.

In another aspect, the present disclosure is directed to a machine. The machine may include a plurality of traction devices, an operator station supported by the plurality of traction devices and housing an interface device, an engine, and a transmission system powered by the engine and configured to drive the plurality of traction devices in response to movement of the interface device. The transmission system may include a step-change section having a plurality of gear sets, an input member configured to drive the plurality of gear sets, an output member driven by the plurality of gear sets to rotate the plurality of traction devices, a plurality of clutches configured to selectively engage select gears of the plurality of gear sets, and at least one synchronizer disposed between the input member and the plurality of clutches. The transmission system may also include a continuously variable section configured to connect a rotation of the engine to the input member of the step-change section. The continuously variable section may have a planetary gear assembly operatively connected to the input member, a mechanical flow path connecting the rotation of the engine to a first portion of the planetary gear assembly, and a hydraulic flow path connecting the rotation of the engine to a second portion of the planetary gear assembly. The transmission system may also include an oil sump configured to supply oil to the hydraulic flow path and to the plurality of clutches, a sensor configured to generate a signal indicative of a temperature of the oil in the oil sump, and a controller in communication in communication with the sensor and the engine. The controller may be configured to count a number of shifts executed since start of operation of the transmission system, track an operational time of the transmission system, and generate an estimated temperature of the plurality of clutches based on the signal and the number of shifts. The controller may further be configured to selectively derate the engine based on the estimated temperature and the operational time of the transmission system.

In another aspect, the present disclosure is directed to a method of operating a transmission system. The method may include detecting an oil sump temperature, and generating an estimated clutch temperature based on the oil sump temperature. The method may further include selectively derating the engine based on the estimated clutch temperature.

BRIEF DESCRIPTION OF THE DRAWINGS

FIG. 1 is an isometric illustration of an exemplary disclosed machine;

FIG. 2 is an isometric illustration of an exemplary disclosed transmission system that may be used with the machine of FIG. 1;

DETAILED DESCRIPTION

Figure 3:
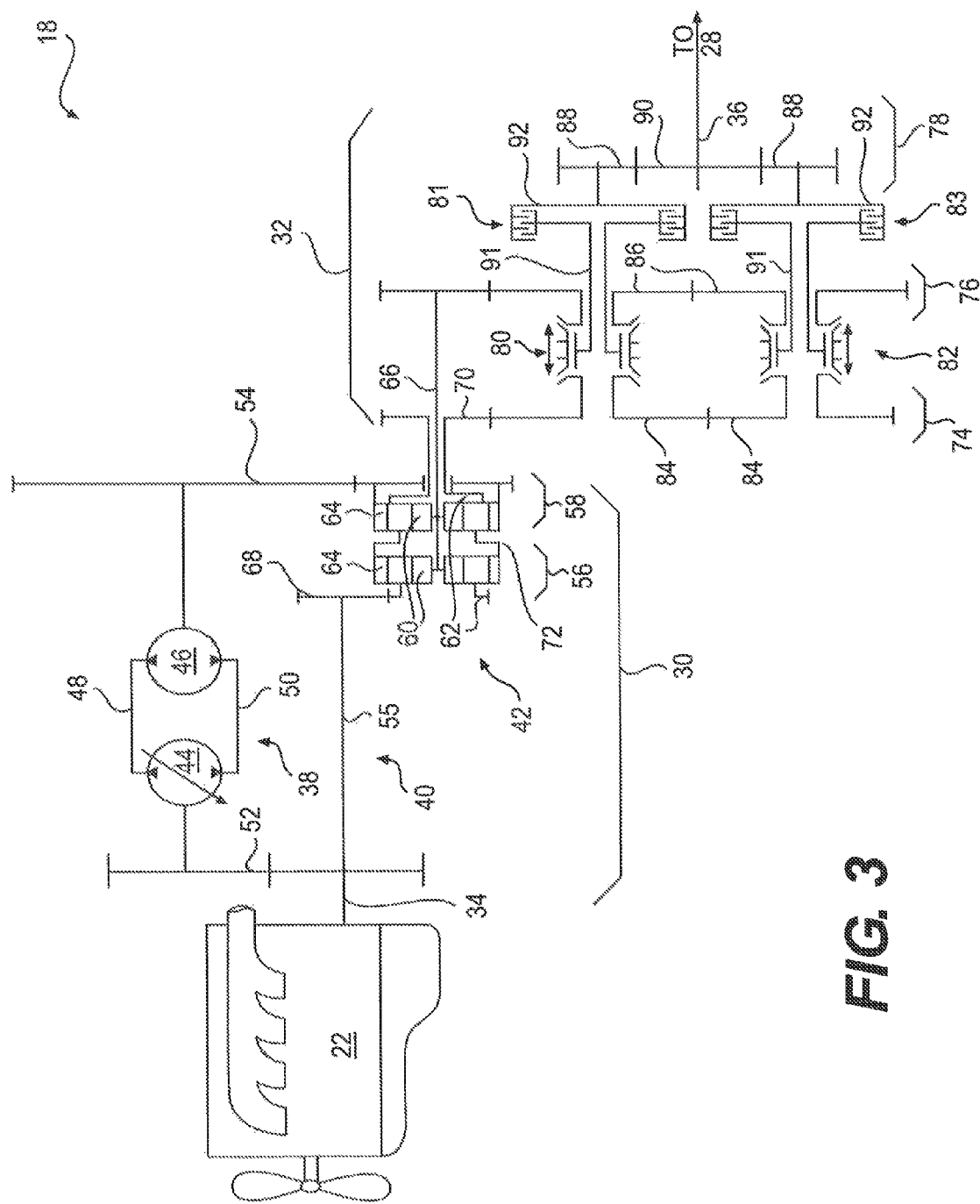
FIG. 3 is a schematic illustration of the transmission system of FIG. 2.

FIG. 1 illustrates an exemplary mobile machine 10. In the depicted embodiment, machine 10 is a wheel loader. It is contemplated, however, that machine 10 may embody another type of mobile machine such as an articulated haul truck, an off-highway mining truck, a motor grader, or another machine known in the art. Machine 10 may include an operator station 12, one or more traction devices 14 that support operation station 12, and a powertrain 16 operatively connected to drive traction devices 14 in response to input received via operator station 12.

Operator station 12 may include devices that receive input from a machine operator indicative of desired machine maneuvering. Specifically, operator station 12 may include one or more operator interface devices 18 located proximate an operator seat 20. Operator interface devices 18 may initiate movement of machine 10 by producing displacement signals that are indicative of desired machine maneuvering. In one embodiment, operator interface devices 18 include a shift lever. As an operator moves the shift lever, powertrain 16 may be caused to shift gears (e.g., between one or more reverse gears, neutral, and one or more forward gears). It is contemplated that an operator interface device 18 other than a shift lever may additionally or alternatively be provided within operator station 12 for movement control of machine 10, if desired.

As shown in FIG. 2, powertrain 16 may be an assembly of components that transfers power from an engine 22 to traction devices 14. In the disclosed embodiment, these components include a transmission system 24 that is operatively connected to and driven by engine 22, one or more axles 26 operatively connected to traction devices 14, and one or more output shafts 28 that connect transmission system 24 to axles 26. In the disclosed embodiment, transmission system 24 includes a continuously variable section (CVS) 30 configured to drive a step-change section (SCS) 32, such that multiple distinct gear ranges may be provided with an infinite number of output ratios within each gear range. In one example, transmission system 24 may produce a reverse gear high-range, a reverse gear low-range, a neutral setting, a forward gear low-range, and a forward gear high-range. Each of these gear settings may be selected by the operator via shift lever 18 described above and/or selected automatically based on a load and/or speed of machine 10.

As shown in FIG. 3, engine 22 may embody a diesel engine, a gasoline engine, a gaseous-fuel powered engine, or any other type of internal combustion engine known in the art. Engine 22 may be configured to generate a mechanical power output having a speed component and a torque component, and to direct the power output to transmission system 24 as an input. Transmission system 24 may include an input member 34 connecting transmission 24 to the mechanical power output of engine 22 (e.g., via a torque converter—not shown), and an output member 36 connecting transmission system 24 to one or more traction devices 14 via shafts 28 and axles 26.

CVS 30 may have multiple flow paths to transmit the power from input member 34 to SCS 32. In particular, CVS 30 may include a first or hydraulic flow path 38, and a second or mechanical flow path 40. First and second flow paths 38, 40 may be disposed parallel to each other, originate from input member 34, and have a common portion through one or more gear assemblies 42 (only one shown in FIG. 3).

Flow path 38 may include, among other things, a pump 44 and a motor 46 interconnected by way of a first fluid passage 48 and a second fluid passage 50. Pump 44 may be, for example, a variable displacement pump powered by engine 22 via input member 34 to pressurize fluid. In the disclosed embodiment, a gear 52 (e.g., a spur or helical gear) is connected to pump 44 and driven by input member 34. In another embodiment (not shown), pump 44 is driven directly by input member 34. In either arrangement, the fluid pressurized by pump 44 may be directed through motor 46 by way of fluid passages 48 or 50 depending on the travel direction of machine 10. Motor 46, being driven by the pressurized fluid, may rotate a portion of gear assembly 42. In the disclosed embodiment, a gear 54 (e.g., a spur or helical gear) connects motor 46 to gear assembly 42. In another embodiment (not shown), motor 46 (e.g., a shaft of motor 46) directly drives gear assembly 42. In either arrangement, the direction and speed of this rotation may affect the output ratio of transmission system 24. A ratio controller (not shown) may manipulate the displacement of pump 44 to thereby control the rotational speed and/or torque of motor 46 and the resulting output ratio of transmission system 24. It is contemplated that motor 46 may also be a variable displacement device, if desired, and controlled together with or separate from pump 44.

Flow path 40, in the disclosed embodiment, is a direct mechanical connection from input member 34 to gear assembly 42. For example, a shaft 55 may extend from input member 34 to a portion of gear assembly 42. In one embodiment, a gear (e.g., a spur or helical gear) 68 may connect shaft 55 to gear assembly 42. In another embodiment, shaft 55 may be fixedly connected to a portion of gear assembly 42. It is contemplated that shaft 55 and input member 34 may be a single integral component, if desired.

Gear assembly 42 generally includes two different planetary gear sets ("sets") 56, 58 arranged coaxially and connected to each other. It is contemplated, however, that SCS 32 could include a greater or lesser number of planetary gear sets, as desired. The structure of sets 56, 58, and the connections therebetween, can be achieved using conventional components. Flow path 38 may connect to and drive set 58, while flow path 40 may connect to and drive set 56. Sets 56, 58 may then interact to produce one or more outputs that drive SCS 32.

Each of sets 56, 58 may include a sun gear 60, at least one planet carrier 62, and a ring gear 64. Sun gears 60 of both sets 56, 58 may be fixedly connected to each other and to a first input 66 of SCS 32. Planet carrier 62 of set 56 may be connected to and driven by gear 68 of flow path 40. Planet carrier 62 of set 58 may be fixedly connected to drive a second input 70 of SCS 32. Ring gear 64 of first set 56 may be fixedly connected to planet carrier 62 of second set 58 via a coupling 72. Ring gear 64 of second set 58 may be connected to gear 54 of flow path 38. In this configuration, engine 22 may provide a fairly consistent input rotation (e.g., consistent speed and direction) via member 34, shaft 55, and gear 68 for a given engine power output, and a variable input rotation (e.g., a variable speed rotation in two different directions) via pump 44, motor 46, and gear 54. The variable input may affect a rotational direction, speed, and/or torque of both inputs 66 and 70 of SCS 32.

SCS 32 may include any number of gear sets that are configured to selectively mechanically transfer power from inputs 66, 70 to output 36 at different speed-to-torque ratios. In the disclosed example, SCS 32 includes three different gear sets ("sets") 74, 76, and 78. Input 66 may connect with set 76, while input 70 may connect with set 74. Either of sets 74, 76 may be selectively linked to set 78 by way of a first synchronizer 80 and a first clutch 81 or by way of a second synchronizer 82 and a second clutch 83. And depending on the connection status of synchronizers 80, 82 and actuation of clutches 81, 83, output 36 may be caused to rotate in the forward or reverse directions, and within the high- or low-gear ranges.

Set 74 may include two gears (e.g., spur or helical gears) 84 that intermesh with each other, one of which also intermeshes with input 70. In this configuration, input 70 may continuously and simultaneously drive both gears 84. Similarly, set 76 may include two gears (e.g., spur or helical gears) 86 that intermesh with each other, one of which also intermeshes with input 66. In this configuration, input 66 may continuously and simultaneously drive both gears 86. Set 78 may also include two gears (e.g., spur or helical gears) 88 that intermesh with each other and with a gear 90 that is fixedly connected to output 36. In this configuration, either of gears 88 may drive the rotation of output 36. In addition, set 78 may also include two ring gears 92, each of which is connected to one of gears 88. A jackshaft 91 may extend between each synchronizer 80, 82 and a corresponding one of clutches 81, 83.

Synchronizers 80, 82 may be axially translatable between three different positions to selectively couple gears 84 or gears 86 with one of jackshafts 91. For example, each of synchronizers 80, 82 are shown in FIG. 3 as being in a middle or neutral position, at which none of gears 84, 86 are connected to either jackshaft 91. From the neutral position, each of synchronizers 80, 82 may be moved to the left (relative to the perspective of FIG. 3) to connect gears 84 to jackshafts 91, or moved to the right to connect gears 86 to jackshafts 91. When synchronizer 80 is moved to the left, the low-range forward gear ratio may be facilitated; and when synchronizer 80 is moved to the right, the high-range reverse gear ratio may be facilitated. When synchronizer 82 is moved to the left, the low-range reverse gear ratio may be facilitated; and when synchronizer 82 is moved to the right, the high-range forward gear ratio may be facilitated. Movement of synchronizers 82 may be based on manual input (e.g., selection of forward and reverse travel direction via shift lever 18), and a speed/load of machine 10. During movement of synchronizers 82, motor 46 may be caused to match the speed of the associated input 66 or 70 with the speed of the corresponding jackshaft 91, thereby facilitating smooth operation of synchronizers 82.

After one of synchronizers 80, 82 has moved to connect the appropriate gear with one of jackshafts 91, clutches 81, 83 may be cooperatively energized and de-energized (i.e., turned on or off) to connect the rotation of jackshaft 91 with a corresponding one of ring gears 92. For example, when shifting from the forward low-range to the forward high-range, clutch 81 will de-energize and clutch 83 will simultaneously energize. This operation is known as a "handoff" of power. The same handoff will occur when shifting from forward to reverse in the low-range, and when shifting from reverse in the high-range to the reverse low-range or the forward high-range. The opposite handoff will occur when shifting in the opposite direction. Care should be taken to properly time the actuation of clutches 81, 83, the motion of synchronizers 80, 82, and the operation of motor 46, such that damage to machine 10 does not occur during the handoff.

Figure 4:
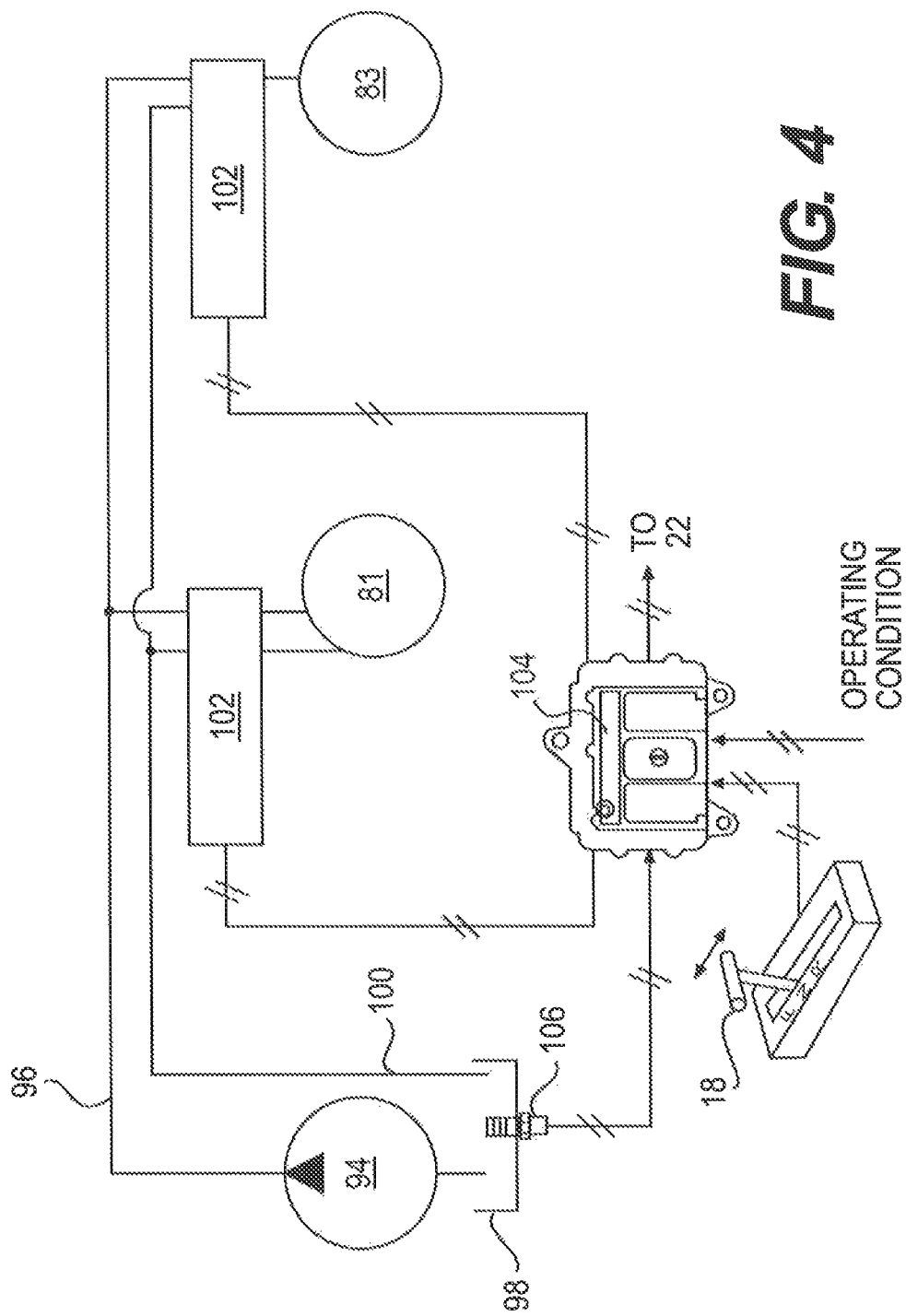
FIG. 4 is control diagram associated with the transmission system of FIG. 2.

FIG. 4 illustrates a control diagram associated with clutches 81, 83. As shown in FIG. 4, clutches 81, 83 may be hydraulically powered. In particular, clutches 81, 83 may be provided with pressurized fluid from a pump 94 via a passage 96. Pump 94 may draw the fluid from a sump 98, and clutches 81, 83 may discharge fluid back to sump 98 via a passage 100. A valve 102 may be associated with each of clutches 81, 83, and movable to selectively cause filling or draining of clutches 81, 83, thereby energizing or de-energizing the respectively clutches 81, 83. In some configurations, valves 102 may be located some distance away from clutches 81, 83, and this distance should be considered when timing cooperation of clutches 81, 83. This may be especially true when the fluid used to actuate clutches 81, 83 is cold and more viscous than during normal operation. An increased viscosity may cause the fluid to flow slower within passages 96, 100, thereby affecting an actuation timing of clutches 81, 83.

A controller 104 may be provided to help regulate operation of clutches 81, 83 and synchronizers 80, 82. Controller 104 may be in communication with each of valves 102, with shift lever 18, with engine 22, and with a temperature sensor 106. Controller 104 may be configured to selectively affect engine operation and coordinated actuation of clutches 81, 83 based on a position of shift lever 18 and a temperature signal from sensor 106. Temperature sensor 106, in the disclosed embodiment, is in fluid communication with sump 98. It is contemplated, however, that temperature sensor 106 could be located elsewhere, if desired. For example, temperature sensor 106 could be located anywhere within a housing of transmission system 24 (e.g., in fluid communication with passage 96, passage 100, pump 44, motor 46, and/or clutches 81, 83).

Controller 104 may include a memory, a secondary storage device, a clock, and one or more processors that cooperate to accomplish a task consistent with the present disclosure. Numerous commercially available microprocessors can be configured to perform the functions of controller 104. It should be appreciated that controller 104 could readily embody a general transmission or machine controller capable of controlling numerous other functions of machine 10. Various known circuits may be associated with controller 104, including signal-conditioning circuitry, communication circuitry, and other appropriate circuitry. It should also be appreciated that controller 104 may include one or more of an application-specific integrated circuit (ASIC), a field-programmable gate array (FPGA), a computer system, and a logic circuit configured to allow controller 104 to function in accordance with the present disclosure.

Figure 5:
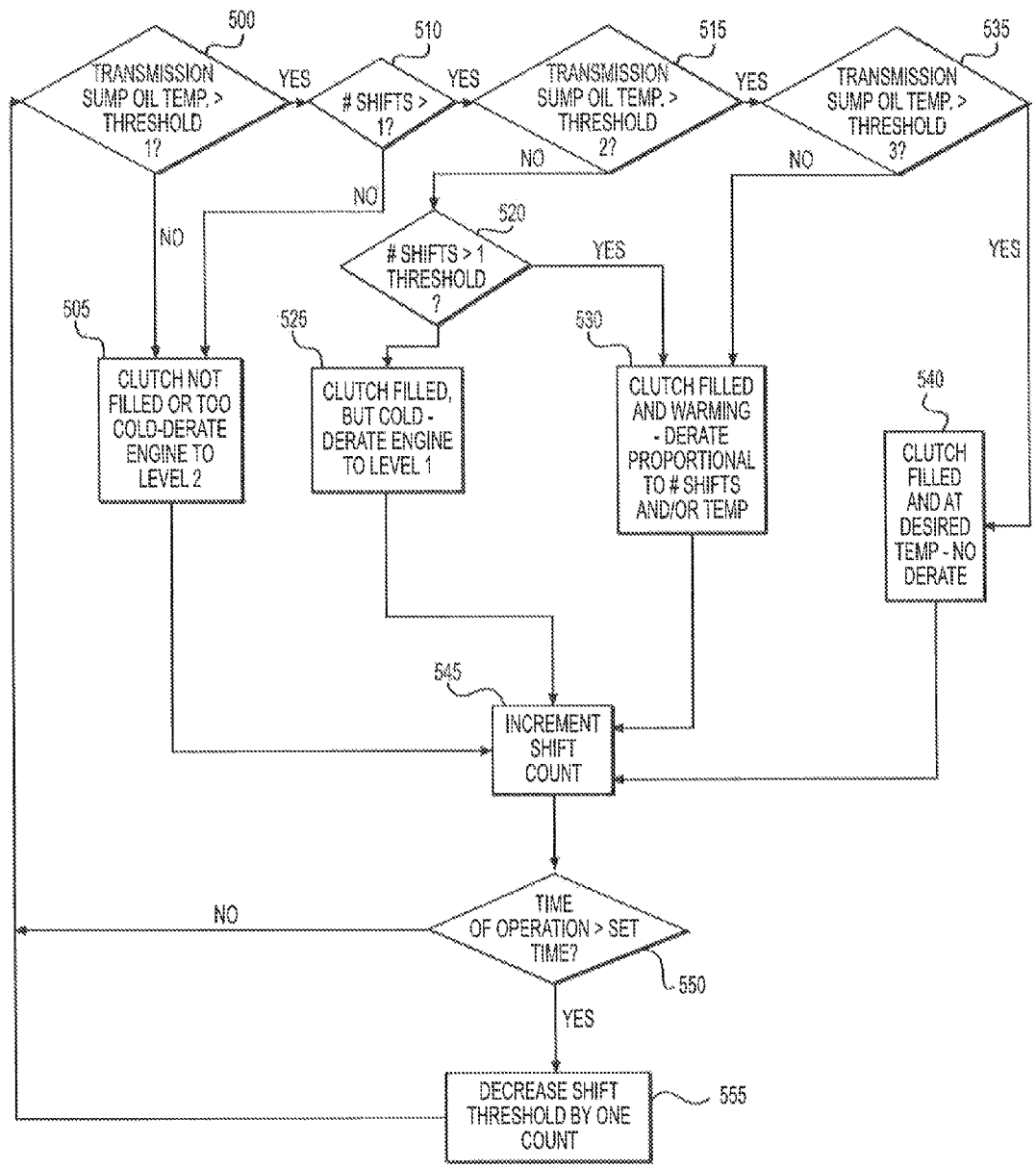
FIG. 5 is flowchart depicting an exemplary disclosed control algorithm associated with operation of the transmission system of FIG. 2.

FIG. 5 illustrates a control algorithm associated with operation of transmission system 24 that can be implemented by controller 104. FIG. 5 will be discussed in the following section to further illustrate the disclosed concepts.

INDUSTRIAL APPLICABILITY

While the transmission system of the present disclosure has potential application in any machine requiring multiple speed and torque transmission levels, the disclosed transmission system may be particularly applicable to wheel loaders, articulated haul trucks, off-highway mining trucks, and other heavy construction machines. Such machines have specific gearing requirements that the disclosed transmission system may be especially capable of meeting. The disclosed transmission system may improve the shift quality of any machine by selectively affecting engine operation based on transmission characteristics such as temperature, shift count, and time of operation. Operation of transmission system 24 will now be described in detail.

At startup of machine 10 and/or when operating in extreme environmental conditions, it may be possible for the conditions to cause rough shifting of transmission system 24. In particular, at startup, passages 96 and 100, synchronizers 80, 82, and/or clutches 81, 83 (referring to FIG. 4) may not yet have been filled with pressurized fluid. And when operating in extreme conditions, the fluid may be cold and viscous. In either of these situations, a time delay may occur when attempting to shift gears. For example, it may be possible for controller 104 to send a signal to clutch 81 commanding clutch 81 to de-energize and at the same time send a signal to clutch 83 commanding clutch 83 to energize. Under normal conditions, this action may take about 500 milliseconds, and both clutches 81, 83 may be caused to move at the same time. However, if one or more of passages 96, 100 are empty when the commands are sent, the time to implement this action may be longer, for example about 1500 milliseconds. And depending on the varying levels of fluid within the different passages, it may take one clutch longer to actuate than another. Likewise, colder and more viscous fluid may flow more slowly than warmer fluid, thereby increasing the delay. An extended delay may allow for the torque output of engine 22 to build to a higher level before clutch actuation and/or for one clutch to release before or after another clutch engages. In either situation, shock loading of transmission system 24 may be the result.

Accordingly, as shown in FIG. 5, upon startup of machine 10, controller may determine if a temperature of the fluid in sump 98 (or elsewhere within transmission system 24) is above a first threshold level (Step 500). As described above, the temperature of sump 98 may be determined via sensor 106. The first threshold level, in one example, is about 10° C., which has been found to correspond with significant actuation delays in some applications. Accordingly, when controller 104 determines that the transmission sump oil temperature is below the first threshold temperature (Step 500: No), controller 104 may derate engine operation (Step 505). In the disclosed example, this derate may be the most severe derate or maximum amount (e.g., a level 2 derate) implemented by the disclosed algorithm, and correspond with about a 50% reduction in engine output (e.g., engine speed and/or torque). In other words, the normal fueling of engine 22 implemented as a result of an operator requested speed and/or torque may be reduced by about 50% when the transmission oil sump temperature is below about 10° C. Such a derate may result in a speed and torque reduction directed through input 34 to transmission system 24, and a corresponding reduction in any shock loading subsequently experienced during shifting. Accordingly, even though delays may exist in the actuation of synchronizers 80, 82 and/or clutches 81, 83 because of the cold temperatures, the result of the delay may be less severe do to the reduction in transmitted power.

It should be noted that the temperature provided by sensor 106 may be used to estimate a temperature of oil within clutches 81, 83. Specifically, oil sump temperature is commonly used for control in many different purposes in machine operation (e.g., to determine overloading, under lubrication, etc.), whereas clutch temperature is not a commonly measured performance parameter. Accordingly, most transmission assemblies may not be equipped to directly measure clutch temperatures. For this reason, sump oil temperature is used in the disclosed embodiment as an estimate of clutch temperature. It is contemplated, however, that clutch temperature could be directly measured, if desired.

Returning to Step 500, if controller 104 instead determines that the transmission oil sump temperature is greater than about 10° C. (Step 500: Yes), controller 104 may then determine if any of shifts have occurred since startup of machine 10. Controller 104 may make this determination by comparing the number of shifts to a first threshold number (e.g., to one—Step 510). Controller 104 may do this because, even if the temperature of sump 98 is above 10° C., it may still be possible for a shift delay to occur if no shifting has yet taken place, as passages 96, 100 could still be empty. Thus, if controller 104 determines that no shifting has occurred (Step 510: No), control may proceed from step 510 to step 505, where engine 22 is derated by about 50%.

However, if at step 510, controller 104 determines that at least one shift has occurred (Step 510: Yes), controller 104 may then compare the transmission sump temperature to a second threshold temperature greater than the first threshold temperature (Step 515). In one example, the second threshold temperature is about 40° C. Controller 104 may complete this comparison because it may still be possible for clutch actuation delay to occur when the temperature of the actuating fluid is about 10-40° C., although the delay may be less than when the temperature is below 10° C.

When the temperature of the actuating fluid in sump 98 is within the range of about 10-40° C. (Step 515: NO), controller 104 may then compare the number of shifts that have occurred since startup of machine 10 to a second threshold number of shifts (Step 520). This comparison should provide controller 104 with a better (i.e., more accurate) estimate of how closely the temperature within clutches 81, 83 matches the temperature within sump 98. In particular, even when the temperature of the actuating fluid in sump 98 is high, if a cold clutch has only been activated a few times, the hot fluid may still cool somewhat as it enters the clutch, resulting in an actuation delay. However, if a particular clutch has cycled hot fluid through it during a number of different shifts, the temperature of the clutch should more closely match the temperature of sump 98. In one example, the threshold number of shifts may be about twenty. Accordingly, when, at step 520, controller 104 determines that the number of shifts is less than twenty, controller 104 may still cause a derate of engine 22 (Step 525). However, because less shock loading may occur during this condition (as passages 96, 100 and/or clutches 81, 83 should be at least partially filled with less viscous fluid), this derate may be lower than the derate of Step 505. For example, controller 104 may derate engine 22 by about 30% at step 525.

Returning to step 520, if controller 104 determines that the count of shifts exceeds the second threshold number of shifts (Step 520: Yes), controller 104 may derate engine 22 by an amount proportional to the shift count (Step 530). In this way, a higher shift count may result in less of a derate.

Returning to step 515, if the temperature within sump 98 is above about 40° C., controller 104 may determine if the temperature is above a third threshold temperature (Step 535). In the disclosed embodiment, the third threshold temperature may be about 65° C., and correspond with little (if any) clutch actuation delay. If the temperature of sump 98 is about 40-65° C. (Step 535: No), control may proceed to step 530 for prorated derate based on temperature. In this way, a higher temperature may result in less of a derate. When, at step 535, controller 104 determines that the temperature of sump 98 is above about 65° C. (Step 535: Yes), controller 104 may disable any engine derate (Step 540).

During operation of machine 10, controller 104 may increment the shift count each time that transmission system 24 is caused to shift gears (e.g., between neutral, forward, reverse, high-range, or low-range) (Step 545). Although Step 545 is shown at a particular location within the flowchart of FIG. 5, it should be noted that shift counting may be done at any time throughout the process.

In addition, controller 104 may track an amount of time that machine 10 has been operational, and compare the time to a set time or threshold amount (Step 550). In one example the threshold amount of time may be about 10 seconds. And for each 10 seconds of operational time that has elapsed, controller 104 may decrease the shift threshold used in the comparison of step 520 by one (Step 555). This may allow for the situation in which machine 10 has been operational in a single gear for some time, such as during roading, and the operator desires full power from engine 22. Full power may be granted in this situation, as the lack of shifting during roading may provide little opportunity (if any) for the accompanying shock loading.

The disclosed control algorithm may be particularly applicable to CVT type transmissions, specifically to dual-path CVT type transmissions like system 24 described above. In transmission system 24, clutches 81 and 83 may be on/off types of clutches (as opposed to the more conventional gradually actuating clutches), wherein handoff timing of their actuation is critical for smooth operation. During an exemplary shift, motor 46 may cooperate with synchronizers 80, 82 to ensure that input speed substantially matches jackshaft speed prior to movement of synchronizers 80, 82. In addition, motor 46 may function to reduce transmitted torque at the handoff point, so as to reduce shock loading associated with the handoff. By controlling engine speed and/or torque based on transmission fluid temperature and/or the number of shifts that have occurred since startup, this shock loading may be even further reduced.

It will be apparent to those skilled in the art that various modifications and variations can be made to the transmission system of the present disclosure without departing from the scope of the disclosure. Other embodiments will be apparent to those skilled in the art from consideration of the specification and practice of the control system disclosed herein. It is intended that the specification and examples be considered as exemplary only, with a true scope of the disclosure being indicated by the following claims and their equivalents.

What is claimed is:

1. A transmission system for use with an engine, the transmission system comprising:
    a plurality of gear sets;
    an input member configured to be powered by the engine and to drive the plurality of gear sets;
    an output member driven by the plurality of gear sets;
    at least one clutch configured to selectively engage select gears of the plurality of gear sets;
    a sump; and
    a temperature sensor configured to generate a signal indicative of a temperature of fluid within the sump; and
    a controller in communication with the engine, the controller being configured to:
        count a number of shifts executed by the at least one clutch since start of operation of the transmission system;
        generate an estimated temperature of the at least one clutch based on the signal and the number of shifts; and
        selectively derate the engine based on the estimated temperature.

2. The transmission system of claim 1, wherein when the temperature of the fluid is below a first threshold temperature, the controller is configured to derate the engine by a maximum amount.

3. The transmission system of claim 2, wherein when the temperature of the fluid is above the first threshold temperature, but the number of shifts is less than a first shift threshold number, the controller is configured to derate the engine by the maximum amount.

4. The transmission system of claim 3, wherein when the number of shifts is above the first shift threshold number, the controller is configured to compare the temperature of the fluid to a higher threshold temperature.

5. The transmission system of claim 4, wherein when the temperature of the fluid is below the higher threshold temperature, the controller is configured to compare the number of shifts to a higher threshold number.

6. The transmission system of claim 5, wherein when the number of shifts is less than the higher threshold number, the controller is configured to derate the engine by an amount less than the maximum amount.

7. The transmission system of claim 5, wherein when the number of shifts is greater than the higher threshold number, the controller is configured to derate the engine by an amount proportional to the number of shifts.

8. The transmission system of claim 5, wherein the controller is further configured to:
track an amount of time elapsed since operation of the transmission system; and
selectively reduce the higher threshold number based on the amount of time.

9. The transmission system of claim 4, wherein when the temperature of the fluid is above the higher threshold temperature, the controller is configured to compare the temperature to a highest threshold temperature.

10. The transmission system of claim 9, wherein when the temperature of the fluid is less than the highest threshold temperature, the controller is configured to derate the engine by an amount proportional to the temperature.

11. The transmission system of claim 9, wherein when the temperature of the fluid is above the highest threshold temperature, the controller is configured to inhibit derate of the engine.

12. The transmission system of claim 1, further including:
a step-change section having the plurality of gear sets, the input member, the output member, and the at least one clutch; and
a continuously variable section configured to connect a rotation of the engine to the input member.

13. The transmission system of claim 12, wherein the continuously variable section includes:
a planetary gear assembly operatively connected to the input member;
a mechanical flow path connecting the rotation of the engine to a first portion of the planetary gear assembly; and
a hydraulic flow path connecting the rotation of the engine to a second portion of the planetary gear assembly.

14. The transmission system of claim 13, wherein the step-change section further includes at least one synchronizer disposed between the input member and the at least one clutch.

15. A machine, comprising:
a plurality of traction devices;
an operator station supported by the plurality of traction devices and housing an interface device;
an engine;
a transmission system powered by the engine and configured to drive the plurality of traction devices in response to movement of the interface device, the transmission system including:
a step-change section having:
a plurality of gear sets;
an input member configured to drive the plurality of gear sets;
an output member driven by the plurality of gear sets to rotate the plurality of traction devices;
a plurality of clutches configured to selectively engage select gears of the plurality of gear sets; and
at least one synchronizer disposed between the input member and the plurality of clutches;
a continuously variable section configured to connect a rotation of the engine to the input member of the step-change section, the continuously variable section having:
a planetary gear assembly operatively connected to the input member;
a mechanical flow path connecting the rotation of the engine to a first portion of the planetary gear assembly; and
a hydraulic flow path connecting the rotation of the engine to a second portion of the planetary gear assembly;
an oil sump configured to supply oil to the hydraulic flow path and to the plurality of clutches;
a sensor configured to generate a signal indicative of a temperature of the oil in the oil sump; and
a controller in communication in communication with the sensor and the engine, the controller being configured to:
count a number of shifts executed since start of operation of the transmission system;
track an operational time of the transmission system;
generate an estimated temperature of the plurality of clutches based on the signal and the number of shifts; and
selectively derate the engine based on the estimated temperature and the operational time of the transmission system.

16. A method of operating a transmission system connected to an engine, the method comprising:
detecting an oil sump temperature;
counting a number of shifts executed since start of operation of the transmission system;
generating an estimated clutch temperature based on the oil sump temperature and the number shifts; and
selectively derating the engine based on the estimated clutch temperature.

17. The method of claim 16, wherein selectively derating the engine includes:
derating the engine by a maximum amount when the oil sump temperature is less than a first threshold temperature or when the number of shifts is less than one;
derating the engine by a lesser amount when the oil sump temperature is above the first threshold temperature but below a second threshold temperature and the number of shifts is less than a threshold number greater than one;
derating the engine by an amount proportional to the number of shifts when the oil sump temperature is above the first threshold temperature but below the second threshold temperature and the number of shifts is greater than the threshold number; or
derating the engine by an amount proportional to the oil sump temperature when the oil sump temperature is above the second threshold temperature but below a third threshold temperature.

18. The machine of claim 15, wherein when the temperature of the oil, in the oil sump, is below a higher threshold temperature, the controller is configured to compare the number of shifts to a threshold number, and
wherein the controller is further configured to:
track an amount of time elapsed since operation of the transmission system; and
selectively reduce the threshold number based on the amount of time.

19. The machine of claim 15, wherein when the temperature of the oil is below a first threshold temperature, the controller is configured to derate the engine by a maximum amount, or
wherein, when the temperature of the oil is above the first threshold temperature and the number of shifts is less than a shift threshold number, the controller is configured to derate the engine by the maximum amount.

20. The machine of claim 15, wherein when the number of shifts is less than a threshold number, the controller is configured to derate the engine by an amount less than a maximum amount, or
    wherein when the number of shifts is greater than the threshold number, the controller is configured to derate the engine by an amount proportional to the number of shifts.

\* \* \* \* \*